United States Patent

Bard

[11] 4,208,375
[45] Jun. 17, 1980

[54] MIXING SYSTEM

[76] Inventor: Max L. Bard, 1604 E. Fourth St., Joplin, Mo. 64801

[21] Appl. No.: 756,008

[22] Filed: Jan. 3, 1977

[51] Int. Cl.² .......................... B01J 8/10; B01F 5/16; C01B 25/28

[52] U.S. Cl. .................................... 422/225; 261/76; 261/DIG. 75; 366/265; 422/228; 422/231; 422/234; 423/302

[58] Field of Search ............... 23/259.2, 259.1, 285, 23/271, 272.6; 261/87, 76, DIG. 75; 137/268; 259/95, 96; 422/189, 193, 194, 224, 225, 228, 230, 231, 234; 366/265

[56] References Cited

U.S. PATENT DOCUMENTS

| | | | |
|---|---|---|---|
| 1,152,769 | 9/1915 | Trent | 23/271 |
| 1,916,473 | 7/1933 | Forrest et al. | 23/252 R X |
| 2,683,622 | 7/1954 | Dragon | 23/272.7 |
| 3,271,304 | 9/1966 | Valdespino et al. | 261/DIG. 75 X |
| 3,557,243 | 1/1971 | Boyle, Jr. et al. | 23/285 X |
| 3,587,976 | 6/1971 | Jacuzzi | 261/DIG. 75 X |
| 3,744,765 | 10/1971 | Bard | 261/87 X |
| 3,904,393 | 9/1975 | Morse | 261/DIG. 75 X |

*Primary Examiner*—Joseph Scovronek
*Attorney, Agent, or Firm*—Victor J. Evans & Co.

[57] ABSTRACT

A mixing device and method of mixing a liquid, vapor, or gas into a slurry of material in a vat in which the liquid, vapor, or gas is introduced into a stream of the slurry passing from the vat through a venturi at the diverging portion of the venturi, and in which the slurry with the entrained liquid, vapor, or gas is returned to the vat below an umbrella of a high velocity stream of slurry in the vat produced by an agitator so as to dissipate the heat of reaction between the two fluids.

8 Claims, 9 Drawing Figures

MIXING SYSTEM

BACKGROUND OF THE INVENTION

Field of the Invention

The primary object of the device, or system is to provide a means and method to incorporate a liquid, vapor, or gas in a slurry in a vat.

Other and further objects and advantages will appear from the following specification taken with the accompanying drawings in which like reference characters refer to similar parts in the several views.

DESCRIPTION OF THE PREFERRED EMBODIMENT

Figure 1:
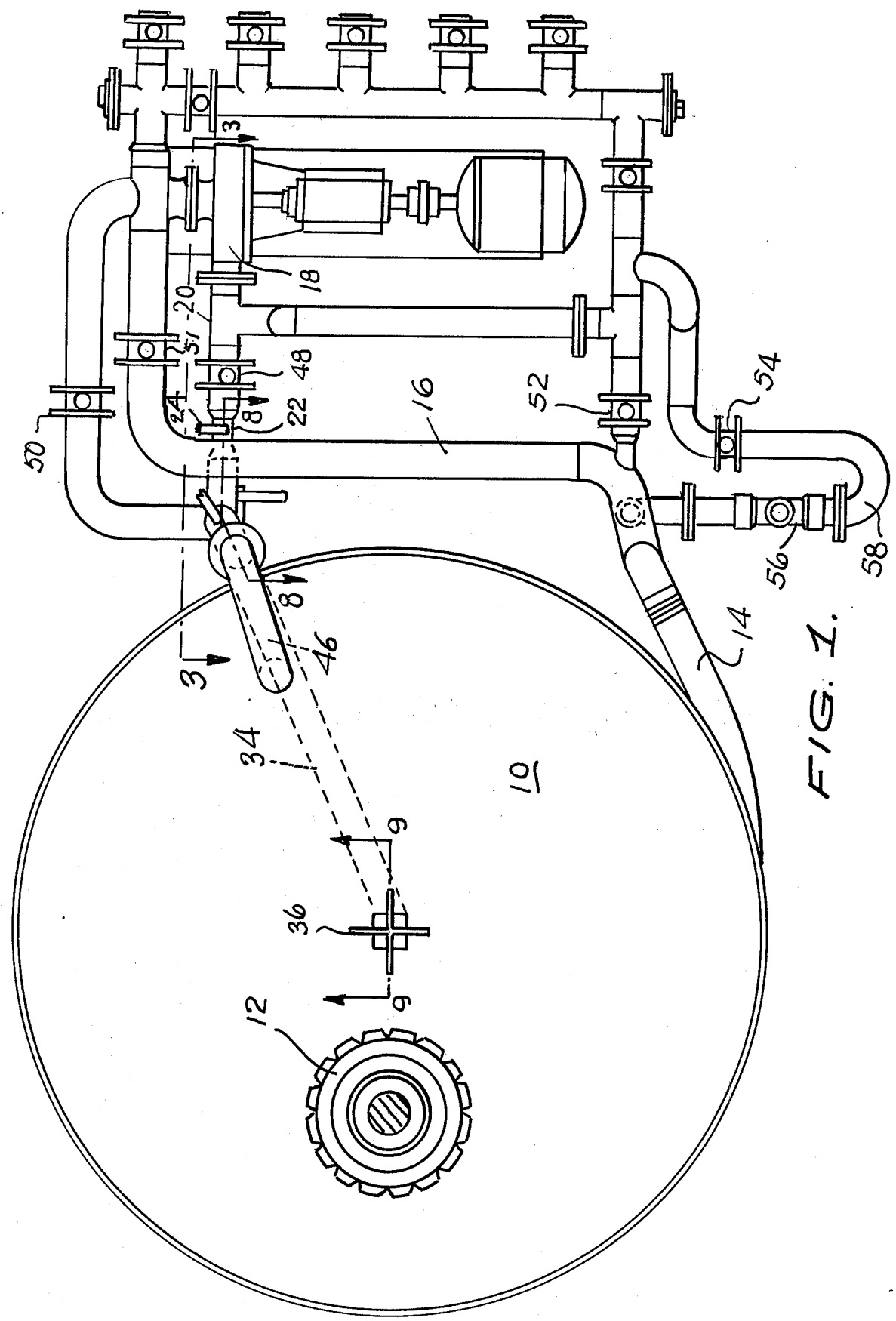
FIG. 1 is a schematic plan view of the system.

The mixer of the present invention includes a mixing vat 10, a turbine or propeller mixing device 12 which, conveniently may be, but is not limited to being the turbine device shown in U.S. Pat. No. 3,744,765.

A suction pipe 14 is connected to the vat 10 at approximately the level of turbine mixer 12. A pipe 16 leads from vat 10 at 14 to the suction side of a centrifugal pump 18 that discharges into a pipe 20 leading to a venturi 22 (see FIG. 8).

Figure 3:
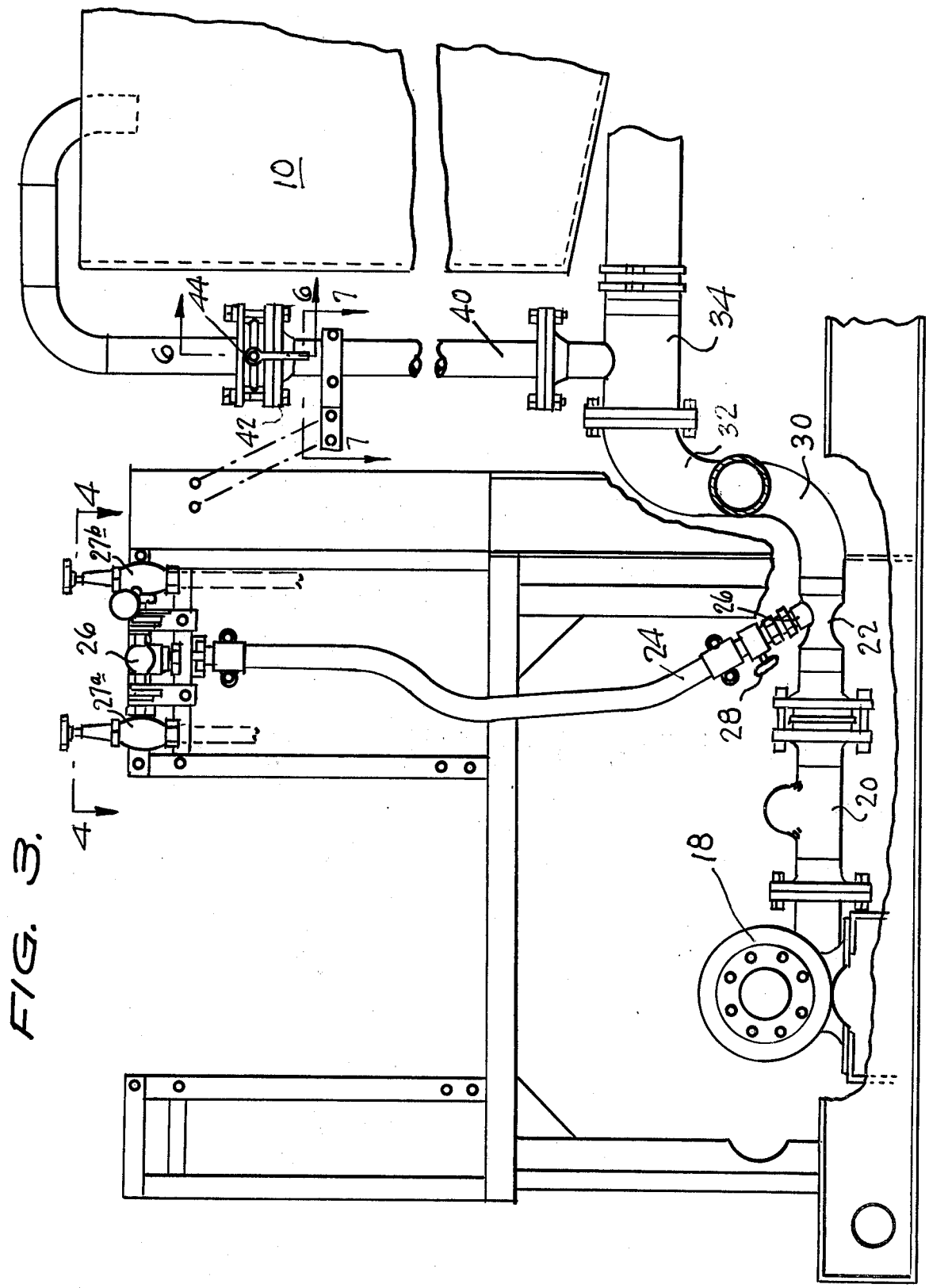
FIG. 3 is a section on line 3—3 of FIG. 1.
Figure 4:
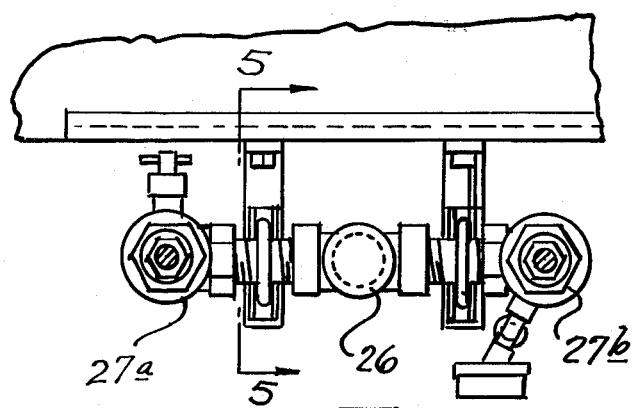
FIG. 4 is a plan of a valve manifold, section on 4—4 of FIG. 3.
Figure 5:
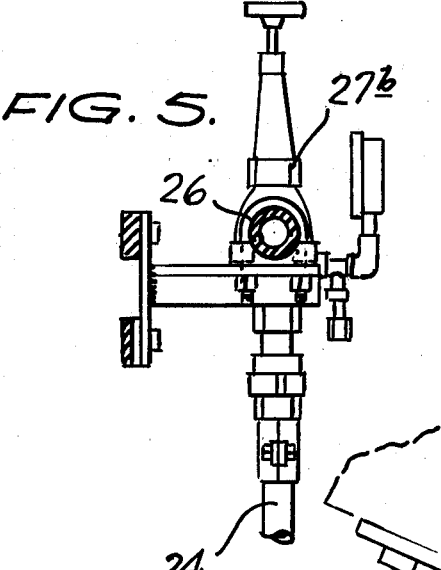
FIG. 5 is a section on 5—5 of FIG. 4.

At the downstream side of venturi 22 is a connection from a supply pipe 24 leading from a supply manifold 26 (FIGS. 3, 4 and 5). The valves 27a and 27b of this manifold are connected to sources of supply of the liquid, vapor, or gas that it may be desired to add to the slurry in the vat 10. A pressure gauge is desirable at the valve 27b supplying gas.

A check valve 26 is located as closely as possible to the inlet into the venturi 22 to avoid any possibility of building up material that might tend to clog the passage especially if the gas will react with the fluid in the venturi (such as $NH_3$ supplied through pipe 24 and phosphate in the slurry being pumped through the venturi). A stop valve 28 is provided adjacent the check valve 26.

Leaving venturi 22 the slurry from vat 10 to which a liquid, vapor, or gas has been added from pipe 24, the slurry passes through elbows 30 and 32. It will be noted that the outlet from elbow 32 is preferably substantially larger than the inlet to elbow 30 from venturi 22.

From elbow 32 the slurry with its additive passes through a pipe 34 of the same diameter as the outlet from elbow 32. Pipe 34 leads the mixture to the bottom of vat 10.

Figure 9:
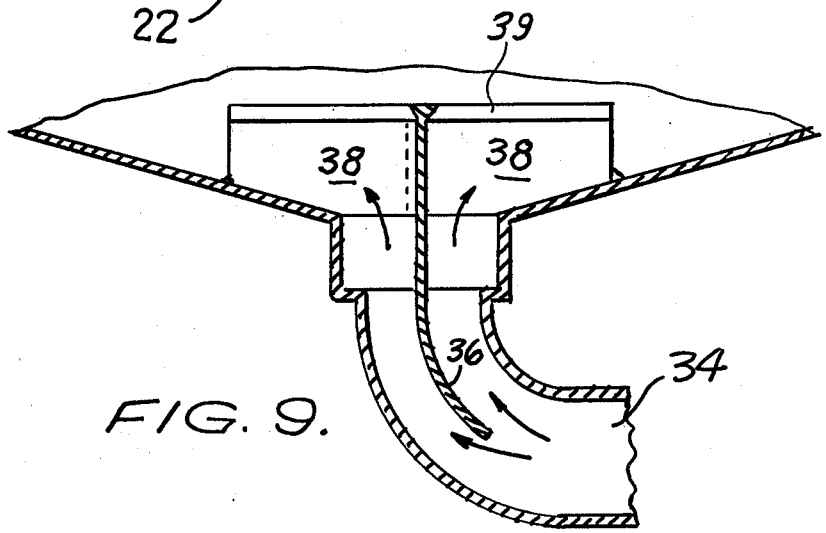
FIG. 9 is an enlarged section on line 9—9 of FIG. 1.

In FIG. 9 it is seen that the end of pipe 34 turns upwardly and a divider 36 is preferably used, along with blades 38, that separate the flow of fluid mixture as it flows generally upwardly into the mass of slurry in vat 10, and also tends to eliminate large bubbles of the additive material. The top edge of blades 38 are preferably shaped at 39 to slightly deflect the flow of the stream.

While a single connection to venturi 22 for the introduction of an additive is shown two or more such connections may be provided to better distribute the additive material in the slurry as it leaves venturi 22.

A gas that reacts with solids can not be safely added to the pulverized solids by merely blowing the gas up through the pulverulent in the dry state. It has been found however, as an instance of the use of the present invention, that $NH_3$ may be added to a slurry of phosphate nitrogen in water (about a one mole ratio of nitrogen to $P_2O_5$). There will be a heat of reaction which will not ordinarily be excessive, and the final mix comes out at a 1.3 to 1.7 mole ratio. The nitrogen content of the slurry is enriched.

Figure 6:
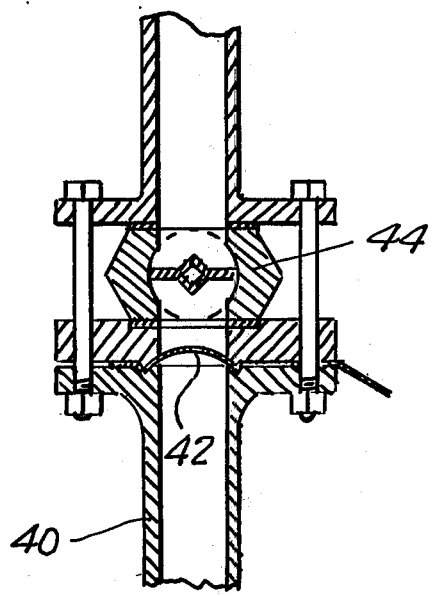
FIG. 6 is a section on line 6—6 of FIG. 3.
Figure 7:
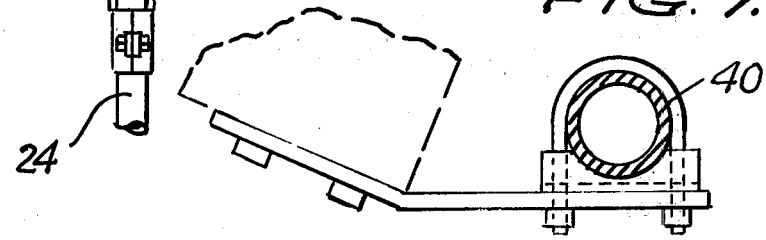
FIG. 7 is a section on line 7—7 of FIG. 6.
Figure 8:
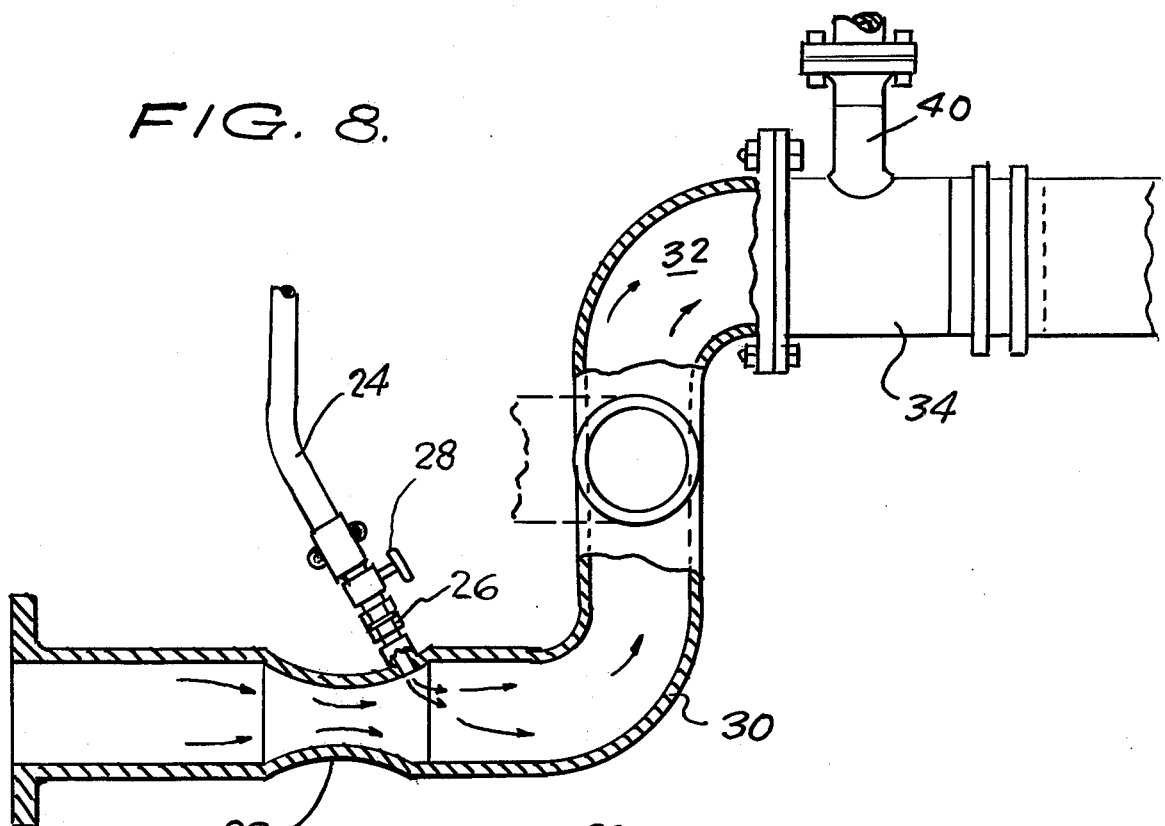
FIG. 8 is an enlarged section on line 8—8 of FIG. 1.

Referring to FIGS. 3, 6 and 8 it will be seen that a branch pipe 40 extends vertically from pipe 34 adjacent elbow 32 and forms a surge chamber and safety device. At the top of pipe 40 is a burstable, replaceable, diaphragm 42 (See FIG. 6). Above diaphragm 42 is a valve 44 that will normally be open when any ingredient is being added that might create a pressure in the piping circuit by rapid reaction with the material in the slurry or when there is a possibility of clogging of the discharge through pipe 34 to the vat 10. From valve 44 a pipe 46 leads up over the top edge of vat 10 so that if diaphragm 42 is burst, any material passing therethrough will be dumped into vat 10.

Figure 2:
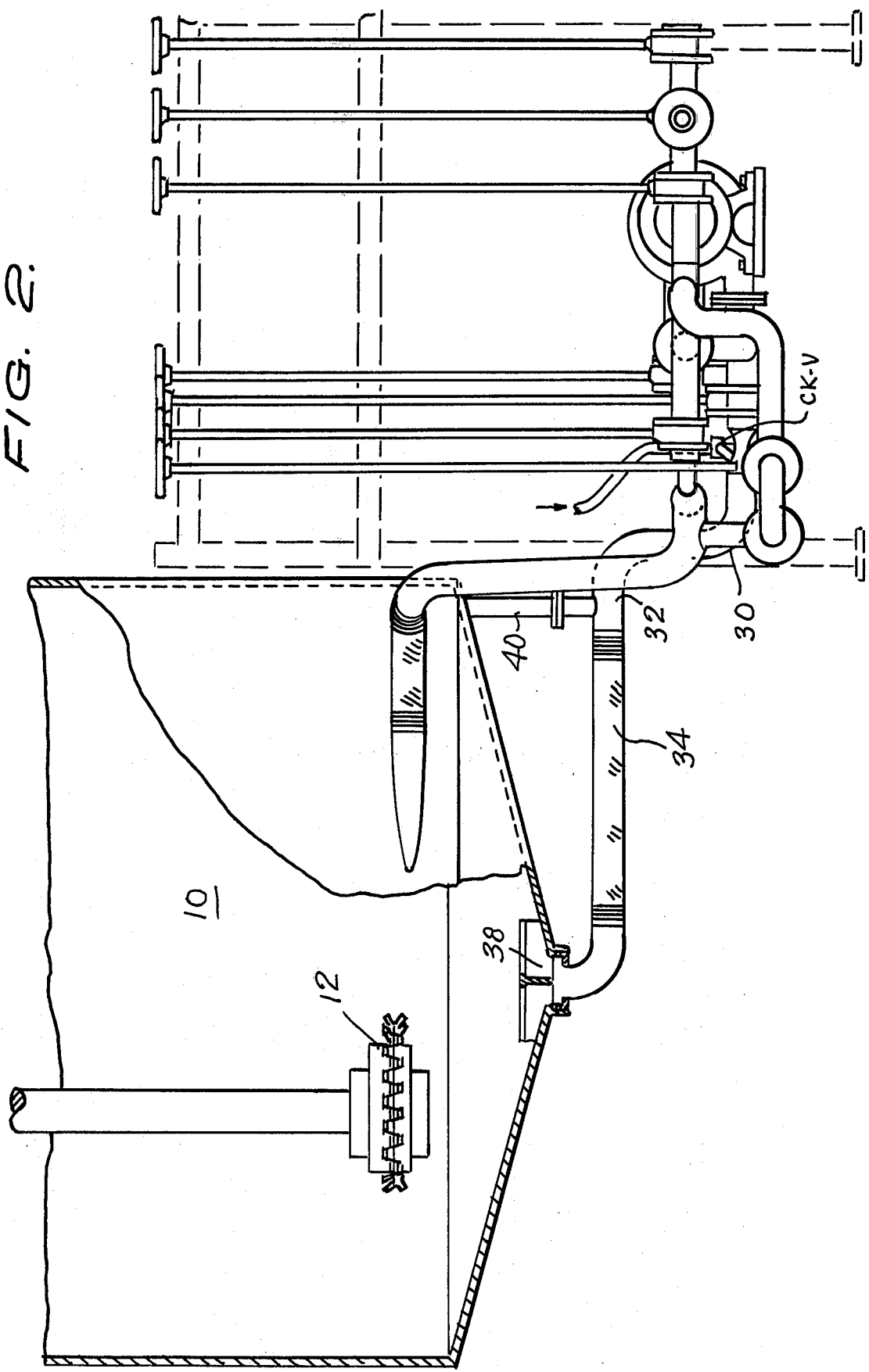
FIG. 2 is a schematic elevation of the system.

Other piping is shown in FIGS. 1 and 2 that render the mixing machine versatile. If cut off valves 48 and 51 are closed and valves 50 and 52 are open, the pump 18 will take suction from the bottom of vat 10 at 38, 36, 34 and discharge to the opening 14 in the side wall of the vat. If valve 54 is opened and valve 52 closed, a dry pulverulent, such as clay, may be introduced at 56 in pipe 58. By manipulation of the several stop valves the suction and discharge of pump 18 may be connected to by-pass pipes to produce the flow in each pipe required for various mixing conditions which may require a deep or a shallow vortex in the fluid slurry in vat 10 as pointed out in U.S. Pat. No. 3,744,765.

Having thus described the preferred embodiment of the invention it should be understood that numerous structural modifications and adaptations may be resorted to without departing from the spirit of the invention.

What is claimed is:

1. An apparatus for mixing at least one additional fluid material into a first fluid material, the combination comprising: a vat containing said first fluid material, mixing means disposed in said vat, a suction pipe connected to said vat to remove said first fluid material, a pump connected to said suction pipe to urge along said first fluid material, a return pipe from said pump to said vat, a venturi disposed on said return pipe having a converging portion proximate to said pump and a diverging portion proximate to said vat and a throat area in between, a first pipe having an outlet on said diverging portion of said venturi which adds said additional fluid material downstream of said throat area, a flow divider provided substantially at the point at which the return pipe directs the flow of first and additional fluid into said vat and in which vertically planar blades are provided in said vat integral to said flow divider to subdivide the flow of first fluid with entrained second fluid as it enters said vat, and said blades have a terminal portion remote from said return pipe that are angled to said vertically planar blades.

2. The apparatus of claim 1 in which a second pipe is provided connected to the return pipe between said venturi and said vat, said second pipe having a burstable diaphragm whereby excessive pressures may be released, and said second pipe has a terminal portion remote from said return pipe that exhausts into said vat.

3. The apparatus of claim 2 in which said first pipe communicates with a manifold which allows the combination of plural fluid materials upstream of said venturi.

4. The apparaus of claim 3 in which the diameter downstream of the venturi of said return pipe between said vat and said venturi increases in diameter.

5. The apparatus of claim 4 in which said second pipe is disposed on the increased diameter return pipe.

6. The apparatus of claim 5 in which third and fourth pipes are provided, said third pipe extending between said return pipe and the pump inlet and said fourth pipe extending between the suction pipe and the pump inlet and valves are disposed on said suction, return, third and fourth pipes to change the flow direction of said mixed material so that said fluid material can go from the bottom of the vat to the side wall opening or vice versa.

7. The apparatus of claim 6 in which a fifth valved pipe is provided on said suction pipe to introduce dry pulverulent material.

8. The apparatus of claim 7 in which said first and second pipes have valves thereon and wherein said manifold has valves thereon.

* * * * *